(12) United States Patent
Wiegand et al.

(10) Patent No.: US 7,050,795 B2
(45) Date of Patent: May 23, 2006

(54) SYSTEM FOR PROGRAMMING CUSTOMIZABLE VEHICLE FEATURES

(75) Inventors: Michael Wiegand, Birmingham, MI (US); Akio Nakano, West Bloomfield, MI (US); Keiichi Aoyama, Novi, MI (US); Thomas Keeling, Redford, MI (US); Justin McBride, West Bloomfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 10/875,922

(22) Filed: Jun. 24, 2004

(65) Prior Publication Data

US 2005/0288837 A1    Dec. 29, 2005

(51) Int. Cl.
*H04M 3/00*    (2006.01)

(52) U.S. Cl. ............... 455/419; 455/88; 455/569.2; 455/575.9

(58) Field of Classification Search ........ 455/418–420, 455/88, 550.1, 569.1, 575.9, 345, 569.2; 340/426.14, 425.5, 428–430
See application file for complete search history.

(56) References Cited

U.S. PATENT DOCUMENTS

| | | | | |
|---|---|---|---|---|
| 4,990,890 A | * | 2/1991 | Newby | ............... 340/426.18 |
| 6,452,483 B1 | | 9/2002 | Chen et al. | |
| 6,563,427 B1 | * | 5/2003 | Bero et al. | ............... 340/573.1 |
| 6,696,931 B1 | * | 2/2004 | Paranjpe | ............... 340/436 |
| 6,697,719 B1 | | 2/2004 | Stouffer et al. | |
| 6,700,479 B1 | * | 3/2004 | Birchfield | ............... 340/426.14 |
| 6,759,943 B1 | | 7/2004 | Lucy et al. | |
| 6,917,801 B1 | * | 7/2005 | Witte et al. | ............... 455/418 |
| 2002/0081972 A1 | * | 6/2002 | Rankin | ............... 455/41 |
| 2002/0096572 A1 | | 7/2002 | Chene et al. | |
| 2002/0146999 A1 | | 10/2002 | Witte | |
| 2003/0054809 A1 | * | 3/2003 | Bridges et al. | ............... 455/419 |
| 2003/0109972 A1 | * | 6/2003 | Tak | ............... 701/29 |
| 2003/0204296 A1 | | 10/2003 | Galli et al. | |
| 2004/0085189 A1 | | 5/2004 | Nagai et al. | |
| 2004/0092253 A1 | * | 5/2004 | Simonds et al. | ............... 455/414.2 |
| 2004/0124968 A1 | | 7/2004 | Inada et al. | |
| 2004/0214560 A1 | * | 10/2004 | Date et al. | ............... 455/418 |
| 2005/0134477 A1 | * | 6/2005 | Ghabra et al. | ............... 455/73 |

FOREIGN PATENT DOCUMENTS

| | | |
|---|---|---|
| DE | 41 41 504 A1 | 8/1992 |
| DE | 10039756 | 2/2002 |
| DE | 10060397 | 6/2002 |
| DE | 10202928 | 7/2003 |
| EP | 0 770 524 A1 | 5/1997 |
| JP | 4-354499 | 8/1992 |

\* cited by examiner

*Primary Examiner*—Joseph Feild
*Assistant Examiner*—Kamran Afshar
(74) *Attorney, Agent, or Firm*—Harness, Dickey & Pierce, PLC

(57) ABSTRACT

A system for communicating user identified preferences to a vehicle includes a programming device adapted to receive input indicative of user defined vehicle settings and operable to store the input as vehicle setting data. A first portable security device is operable to transmit a first identification code. A transceiver residing in the vehicle is in data communication over a wireless communication link with each of the first portable security device and the programming device. The transceiver is operable to initiate download of the vehicle setting data to the vehicle upon receipt of the first identification code from the first portable security device.

19 Claims, 5 Drawing Sheets

SYSTEM FOR PROGRAMMING CUSTOMIZABLE VEHICLE FEATURES

FIELD OF THE INVENTION

The present invention relates to programmable features in a vehicle and more particularly to a system for programming and updating programmable features in a vehicle.

BACKGROUND OF THE INVENTION

Many vehicles provide adjustable features for accommodating different preferences of various drivers. For example, some vehicles allow the user to adjust seat position, mirror position, radio presets and other components of the vehicle. In addition, some vehicles allow the user to "save" the current vehicle settings as a preset for example. In this way, if the vehicle settings are altered by another driver, the preset configuration may be easily retrieved by the push of a button for example.

As vehicle technology has progressed, so has the number and complexity of programmable features. For example, many vehicles have the ability to program features including automatic door locks, dome light off time, mirror tilt on reverse, alert style to signal when the vehicle has been locked remotely and many other features. Sometimes it becomes inconvenient to manipulate and store the numerous programmable features from driver to driver. Furthermore, sometimes it may be undesirable to allow a third party vehicle operator the ability to manipulate certain features of the vehicle.

SUMMARY OF THE INVENTION

A system for communicating user identified preferences to a vehicle includes a programming device adapted to receive input indicative of user defined vehicle settings and operable to store the input as vehicle setting data. A first portable security device is operable to transmit a first identification code. A transceiver residing in the vehicle is in data communication over a wireless communication link with each of the first portable security device and the programming device. The transceiver is operable to initiate download of the vehicle setting data to the vehicle upon receipt of the first identification code from the first portable security device.

According to other features, a second portable security device is associated with a second user setting data stored in the programming device. The second portable security device is operable to transmit a second identification code. The transceiver is operable to establish priority between the first and the second identification code and initiate download of one of the first and the second user settings based on the priority.

A system for communicating user identified preferences to a vehicle includes a programming device operable to receive input indicative of user defined vehicle settings. A portable security device is operable to receive the user defined vehicle settings and store the user defined vehicle settings as vehicle setting data. A transceiver residing in the vehicle is in data communication over a wireless communication link with the portable security device. The transceiver is operable to initiate download of the vehicle setting data from the portable security device to the vehicle upon receipt of an identification code from the portable security device.

According to other features, a data transfer medium communicates the user defined vehicle settings from the programming device to the portable security device as vehicle setting data. The programming device communicates the user defined vehicle settings over a wireless communication link to the portable security device as vehicle setting data. The transceiver is operable to transmit a polling signal to the portable security device. The portable security device is operable to respond to the polling signal with the identification code. The transceiver is operable to determine if the identification code corresponds to a predetermined identification code and receive the vehicle setting data from the portable security device based on the identification code corresponding to the predetermined identification code.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
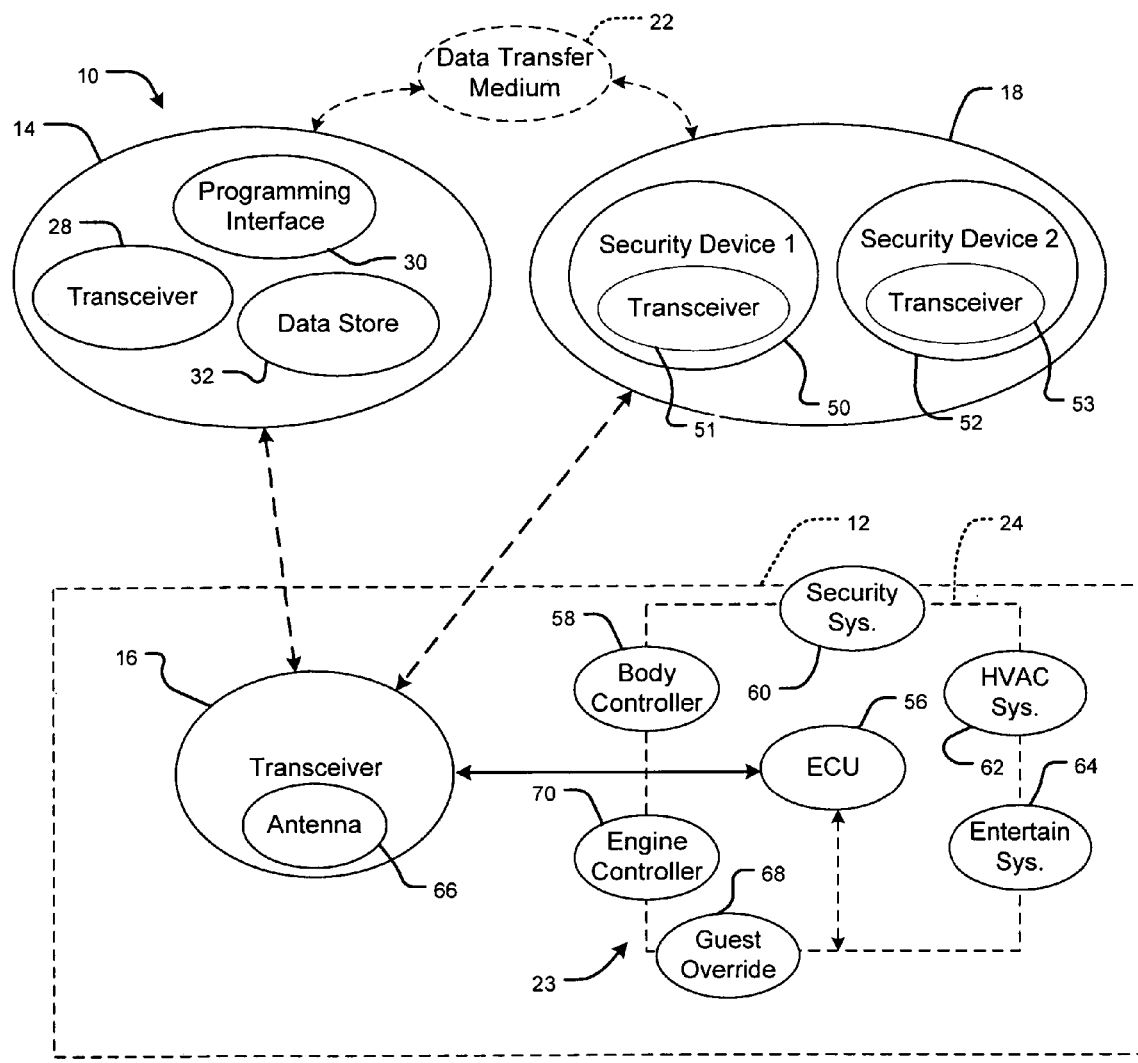
FIG. 1 is a diagrammetrical representation of the system according to the present invention.

With initial reference to FIG. 1, an exemplary system according to the present teachings is shown and identified generally at reference numeral 10. The system 10 is illustrated operatively associated with a vehicle 12. The system 10 generally includes a portable device or programming device 14 communicating with a transceiver 16, a security device 18 communicating with the transceiver 16, a data transfer medium 22 communicating between the portable device 14 and the security device 18, and a plurality of vehicle modules 24. As will be described in greater detail, the system 10 allows multiple users to easily communicate programmable features to the vehicle modules 24.

Figure 1A:
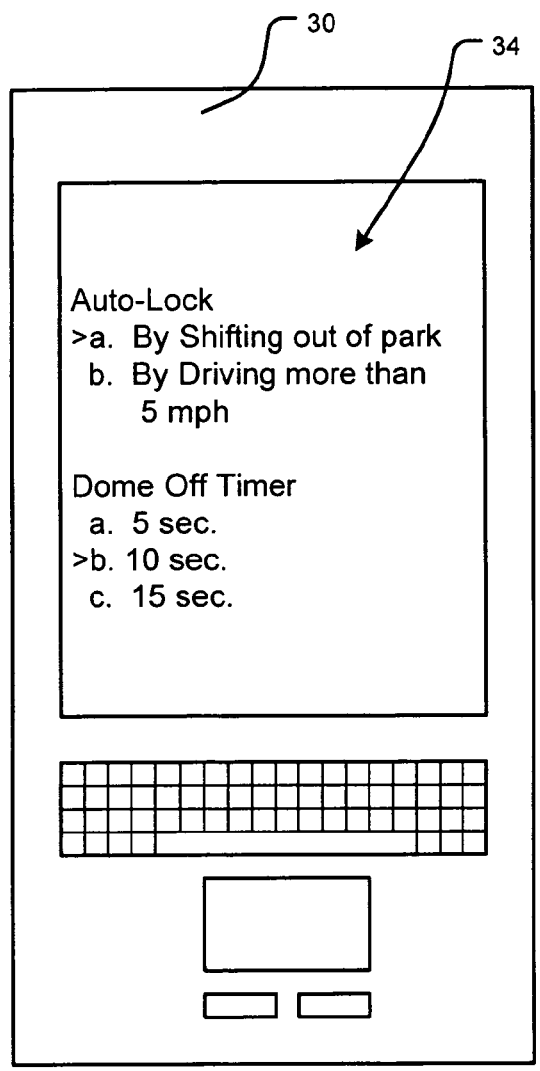
FIG. 1A is a plan view of an exemplary programming device according to the present invention.

With continued reference to FIG. 1 and further reference to FIG. 1A, the programming device 14 generally includes a transceiver 28, a programming interface 30 and a data store 32. The programming device 14 may include a cell phone, personal digital assistant (PDA), personal computer, or cell phone for example. The programming interface 30 is operable to receive user inputs in response to a series of programmable function inquiries presented to the user. For example, the programming interface 30 may be configured to utilize software to create a graphical or text based menu interface 34 that can program all adjustable features in the vehicle 12. Exemplary user features may include the time interior lights stay on in the vehicle after the user enters or exits the vehicle, the time the headlights stay on after the user exits the vehicle, which lights turn on and for how long when the user approaches the vehicle, and timing of automatic door locks. Those skilled in the art will appreciate that this list is not inclusive and some of these programmable features may be removed and/or other programmable features may be incorporated. As will be appreciated from the discussion herein, the exemplary programming interface 30 illustrated in FIG. 1A may be an integral component of the programming device 14, or alternatively a distinct component.

The transceiver 16 associated with the vehicle 12 is operable to receive a signal generated from the transceiver 28 of the programming device 14. The transceiver 16 is operable to communicate vehicle settings to the ECU 56 which communicates to the vehicle modules 23 through a BUS 24. The transceiver 16 is further operable to transmit a signal to the programming device 14.

The transceiver 16 is also operable to communicate with the security device 18 such as a first security device 50 and a second security device 52. The first and second security device 50 and 52, respectively, may comprise a key operable to communicate through respective transceivers 51 and 53, a security code to the transceiver 16 of the vehicle 12. It is contemplated that the first and second security device, 50 and 52, also referred to as a smart entry remote, and the system 10 as a whole may incorporate keyless operational features as set forth in commonly owned U.S. patent application Ser. No. 10/730,091, also U.S. Patent Application Publication No. 2004/0119628, entitled "Vehicle Electronic Key System", the contents of which are incorporated herein by reference. It is appreciated that the programming device 14, having the transceiver 28 and the data store 32, may be integrally incorporated into the security devices 50 and/or 52.

In one implementation, during operation, an interrogational signal is transmitted by the transceiver 16 at predetermined intervals from the vehicle 12. The security device 18 transmits an ID code to the transceiver 16 of the vehicle 12 in response to the interrogational signal. The ID code transmitted from the security device 18 is checked in the vehicle 12 whether the ID code corresponds to a registered ID code of the vehicle 12. When the ID code of the security device 18 corresponds to the registered ID code, an ECU 56 of the vehicle 12 sets doors (not specifically shown) to an unlock-standby state. Then, when the user having the security device 18 touches one of the doors in the unlock-standby state, the doors are unlocked in response to a detection of the touch via a touch sensor (not specifically shown).

The vehicle modules 23 associated with the vehicle 12 will now be described. It is appreciated that the vehicle modules 23 are merely exemplary and that the transceiver 16 may be configured to communicate to the ECU 56 through the BUS 24 and to the vehicle modules 23 user programmable features. Similarly, the transceiver 16 may be configured to communicate with only some or only one of the exemplary vehicle modules 24 illustrated. The vehicle modules 24 include the ECU 56, a body controller 58, a security system 60, an HVAC system 62, an entertainment system 64 such as a radio or multimedia system, an antenna 66, a guest override switch or button 68 and an engine controller 70.

The antenna 66 may be located at any desirable location associated with the vehicle 12 such as in the transceiver 16, the ECU 56, a vehicle door, door handle, bumper, window, and roof (not specifically shown), or in a location inside the vehicle 12 for example. It is appreciated that more than one antenna may be incorporated. The guest override switch 68 may be actuated to disable automatic feature adjustment.

The system 10 according to a first implementation will now be described in greater detail with specific references to FIGS. 1–4. In the first implementation, the transceiver 28, the programming interface 30 and the data store 32 are incorporated into the programming device 14 such as a PDA, laptop or cell phone for example. When the security device 18 reaches an operational proximity to the vehicle 12, the transceiver 16 communicates with the programming device 14 and the ECU 56 to verify and/or update the programmable features associated with the programming device 14.

Figure 2:
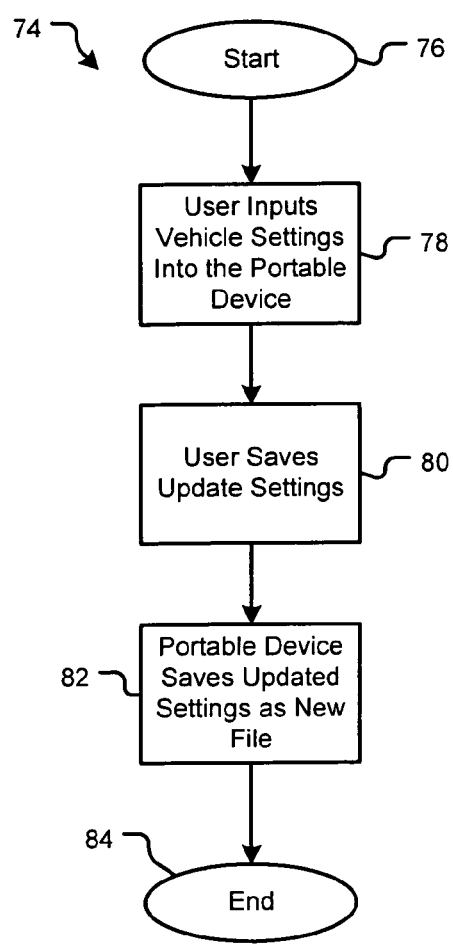
FIG. 2 is a functional block diagram illustrating an exemplary method for programming a programming device according to a first implementation of the present invention.

With reference to FIG. 2, an exemplary method 74 for storing a personalized setting file will be described. The method for storing begins in step 76. In step 78, a user inputs vehicle settings into the programming device 14 in response to a series of prompts such as through a graphical or text based menu interface (as, for example, illustrated in FIG. 1A). In step 80 the user saves the updated settings in the data store 32 of the programming device 14. In step 82 the data store identifies the updated settings as a new file. It is contemplated for security purposes, that the updated settings may only be saved in the data store 32 of the programming device 14 when a security device 18 is within an operational proximity. The method of storing a personalized setting ends in step 84.

Figure 3:
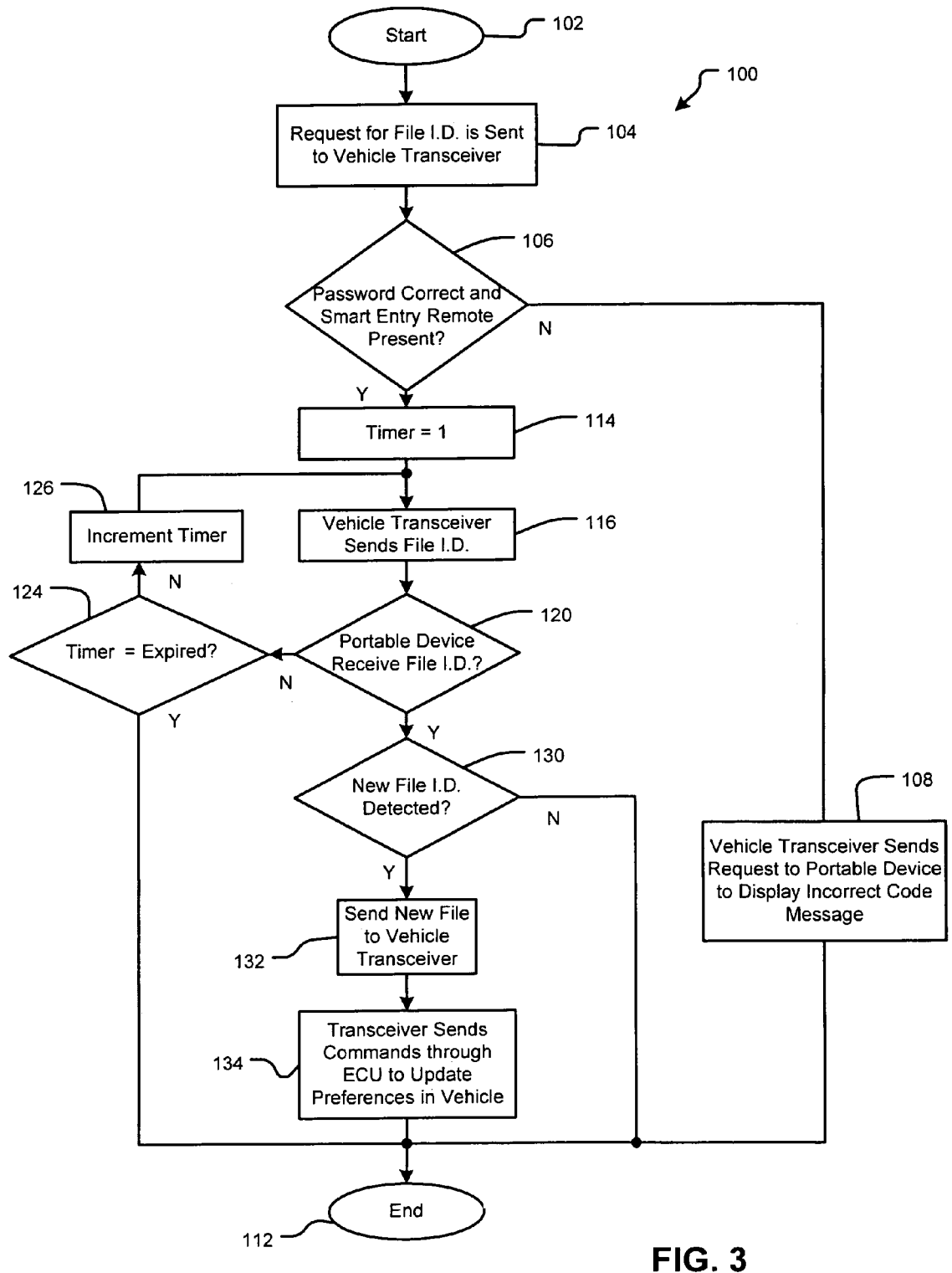
FIG. 3 is a functional block diagram illustrating an exemplary method for updating user preferences according to the first implementation.

Turning now to FIG. 3, an exemplary method 100 for updating user preferences to the vehicle 12 will be described with respect to the first implementation. The method of updating user preferences begins in step 102. In step 104 a request for a file I.D. is sent to the vehicle transceiver 16. The request may be triggered by turning on the programming device 14 or by updating the user preferences on the programming device 14. The file I.D. may include any suitable file designation such as a time stamp, date stamp or any other identifier.

In step 106 control determines if a password communicated is correct and if the security device 18 is present. If the password or presence of the security device 18 is not sufficient, the vehicle transceiver 16 sends a request to the programming device 14 to display an error message in step 108 and control ends in step 112. If the password and presence of the security device 18 is sufficient, a timer is initiated in step 114. In step 116, the vehicle transceiver 16 communicates a user preferences file to the programming device 14. In step 120 the programming device 14 determines if the file I.D. has been received. If the file I.D. has not been received, control determines if the timer has expired in step 124. The timer may be set to any suitable time. If the timer has not expired control increases the timer in step 126 and loops to step 116. If the timer has expired, control ends in step 112.

If the programming device 14 receives the file I.D. in step 120, control determines if a new file I.D. has been detected in step 130. If a new file I.D. has not been detected, control loops to step 134. If a new file I.D. has been detected in step 130, the new file is communicated to the vehicle transceiver 16 in step 132. In step 134, the vehicle transceiver 16 communicates commands representative of the updated preferences through the ECU 56 to the necessary vehicle module 23. As used herein, communication between the respective transceivers 16 and 28 may comprise wireless data transmission providing a secure download of a user preference file. Control then ends in step 112. Again, as previously described, the programming device 14 may comprise a cell phone, PDA, personal computer or other device. Accordingly, remote access to such devices may be facilitated through an internet connection.

Figure 4:
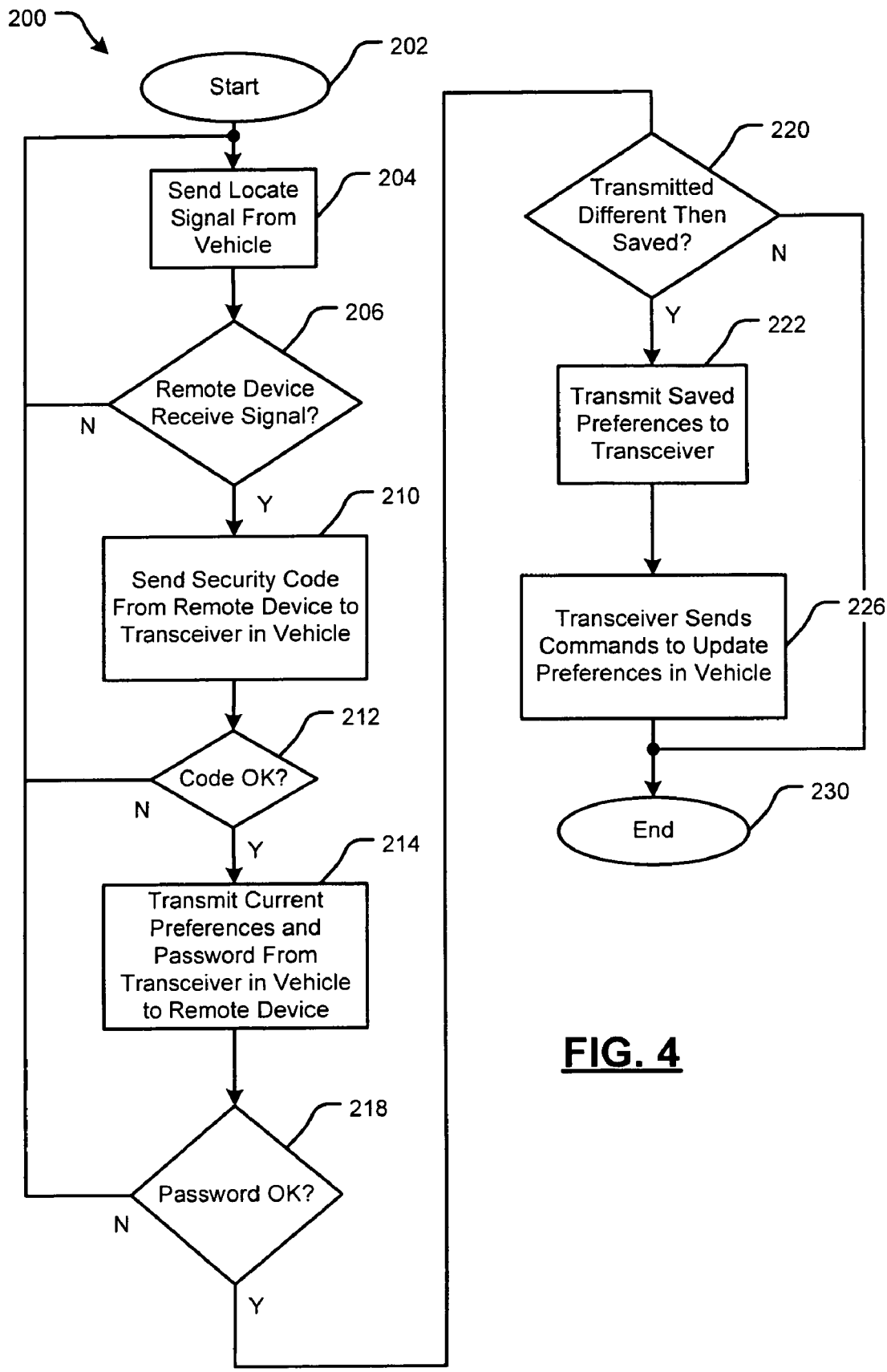
FIG. 4 is a functional block diagram illustrating an exemplary method for updating user preferences according to a second implementation.

With continued reference to FIG. 1 and further reference to FIG. 4, the system 10 according to a second implementation will now be described in greater detail. In the second implementation, the programming device 14 includes the programming interface 30 and the data store 32 incorporated into the security device 18 (or smart key(s) 50 and/or 52).

In this implementation, the security device 18 is programmed through the programming interface 30 (such as a computer) and stored in the security device 18 through the data transfer medium 22.

The data transfer medium 22 may include a cradle or docking station that may be operable to accept the security device 18 and communicate data from the programming interface 30 to the security device 18. The docking station may also be adapted to provide a charge to the security device 18. It is also contemplated that communication between the programming interface 30 and the security device 18 may be wireless, such as through an infrared signal. Likewise, communication may be provided through an electrical wire such as a USB connection. The data transfer medium 22 may be a standalone component or incorporated as an integral feature with the vehicle 12 for easy access. It is appreciated that the second implementation may alternatively provide a programming device 14 including an integral transceiver 28, data store 32 and security device 18.

With specific reference to FIG. 4, an exemplary method 200 for updating user preferences upon user approach to the vehicle 12 will be described with respect to the second implementation. Control begins in step 202. In step 204 the transceiver 16 communicates an interrogational signal from the vehicle 12. In step 206 control determines if the security device 18 has received the signal. If not, control loops to step 204. If the security device 18 has received the interrogational signal, a security code is communicated from the security device 18 to the transceiver 16 in the vehicle 12 in step 210. In step 212, control determines if the security code is correct. If not, control loops to step 204. If the correct security code has been communicated from the security device to the transceiver 16, the current preferences (stored in the data store) and a password are communicated from the transceiver 16 to the security device 18 in step 214. In step 218 control determines if the password is correct. If not, control loops to step 204.

If the password is correct, control determines if the transmitted preferences are different than the current preferences provided in the ECU 56 in step 220 (again the preferences may be stored elsewhere). If the transmitted preferences are not different than the preferences provided in the ECU 56, control loops to step 226. If the transmitted preferences are different than the preferences in the ECU 56, the saved preferences in the data store of the security device 18 are communicated to the transceiver 16 in step 222. In step 226, the transceiver 16 communicates the updated settings to the vehicle modules 24 as required. Control ends in step 230. It is appreciated that the transmission of data from the data store may include any wireless communication. Furthermore, the wireless communication between the transceiver 16 in the vehicle 12 and the data store 32 may include communication between the programming device 14 and the data store 32 through an internet link.

With continued reference to FIG. 1 and further reference to FIG. 5, the system 10 according to a third implementation will now be described in greater detail. In the third implementation, the user inputs user preferences into the programming device 14 through the programming interface 30. The transceiver 28 of the programming device 14 then communicates with the transceiver 16 in the vehicle 12 as will be described below in relation to FIG. 5. In one aspect, the programming device 14 may only allow the user preferences to be stored in the data store 32 based on the portable security device 18 attaining an operational proximity to the programming device 14.

Figures 5, 6, 7:
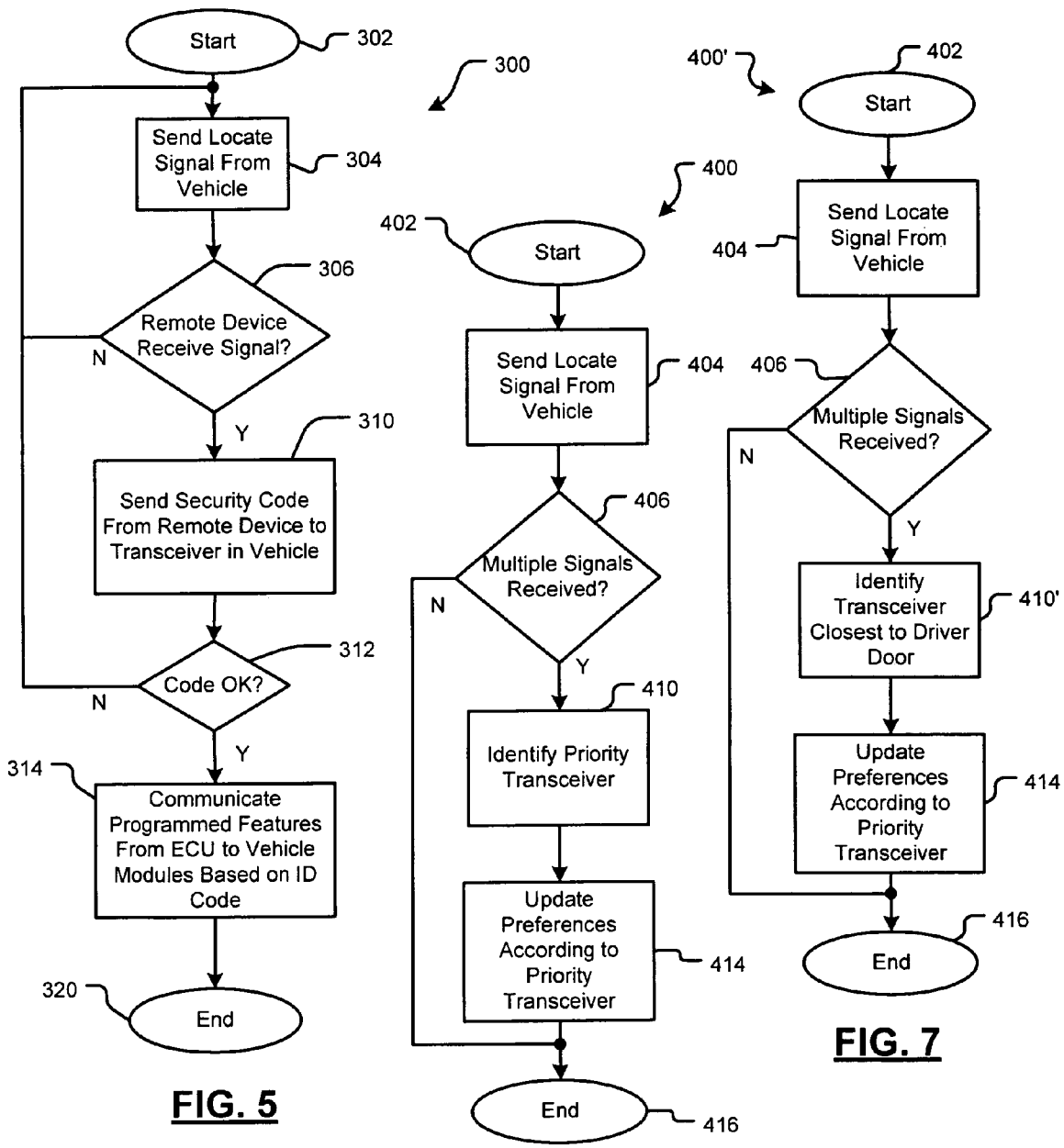
FIG. 5 is a functional block diagram illustrating an exemplary method for updating user preferences according to a third implementation.
FIG. 6 is an exemplary method for determining prioritization according to the present invention.
FIG. 7 is an alternate exemplary method for determining prioritization according to the present invention.

With reference to FIG. 5, an exemplary method 300 for updating user preferences upon user approach to the vehicle 12 will now be described with respect to the third implementation. Control begins in step 302. In step 304 the transceiver 16 communicates an interrogational signal from the vehicle 12. In step 306 control determines if the transceiver 51, 52 has received the signal. If not, control loops to step 304. If the transceiver 51, 52 has received the interrogational signal, a security code is communicated from the transceiver 51, 52 associated with the programming device 14 to the transceiver 16 associated with the vehicle 12.

In step 312, control determines if the security code is correct. If not, control loops to step 304. If the correct security code has been communicated from the security device 18 to the transceiver 16, the current preferences (stored in the vehicle 12 such as by the ECU 56), are communicated to the appropriate vehicle modules 23 according to the vehicle preferences stored in the data store 32 in step 314. Control ends in step 320.

With reference to FIGS. 6 and 7, methods 400 and 400' of prioritizing security devices 18. The method 400 may be applied to any of the implementations described herein. Prioritization is necessary when there is more than one transceiver 28 (such as the instance when two security devices 50 and 52 having transmitting devices 51 and 53 are in the possession of two approaching passengers intending to enter the vehicle 12). Control begins in step 402. In step 404 an interrogational signal is communicated from the transceiver 16 of the vehicle 12. In step 406 control determines if multiple signals have been received. If multiple signals have not been received, control ends in step 416. If multiple signals have been received, control identifies the transceiver 51 or 53 (key 50 or 52) having priority in step 410. For example, priority may be predetermined by a given security device. The security device 18 (key 50 or 52) may be identified to the user as having a number "1" for example or have an identifiable color. It is contemplated that prioritization may be determined at a dealership or upon initial acquisition of the vehicle 12. In step 414, the preferences are updated according to the priority transmitter. Control ends in step 416.

With reference to FIG. 7, an alternate method 400' of prioritization is illustrated. For clarity, similar steps are identified with like reference numerals. In step 410' control identifies the transceiver 51, 53 (key 50 or 52) having the closest proximity to the antenna 66. It is contemplated in this implementation, the antenna 66 is incorporated in the driver door (not specifically shown). As such, the user approaching the driver door is identified as the priority driver and the programmable settings associated with the transceiver 51, 53 on the person of that user will be used. It is further contemplated for the methods explained with respect to FIGS. 6 and 7, a unique programming device 14 may be assigned to each security device 50 and 52. In this way, communication is initiated with a designated programming device 14 having user preferences associated with one of the security devices 50 and 52.

Those skilled in the art can now appreciate from the foregoing description that the broad teachings of the present invention can be implemented in a variety of forms. For example, some components of the vehicle 12 are represented as unique devices. It is appreciated that some components may be integrated. For example, the antennas 66 and the transceiver 16, may in any combination be incorporated into the vehicle ECU 56. Similarly, the transceiver 16 may be added to an existing component or an existing component may already have the capability to receive and communicate commands to other components.

The wireless communication as discussed herein may be any suitable communication standard such as, but not limited to Bluetooth®, or WiFi for example. It is also contemplated that the programmable settings communicated between the data store and the transceiver 16 may also include audio files or video files, for example to be communicated to the entertainment system 64 of the vehicle 12. In addition, it is contemplated that file updates of user preferences to the vehicle transceiver may only be communicated at appropriate times such as when the vehicle 12 is in park. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for communicating user identified preferences to a vehicle comprising:
   a programming device adapted to receive input indicative of user defined vehicle settings and operable to store said input as first and second vehicle setting data;
   a first portable security device operable to transmit a first identification code;
   a transceiver residing in the vehicle and in data communication over a wireless communication link with each of said first portable security device and said programming device, said transceiver operable to initiate download of said first vehicle setting data from the programming device to the vehicle upon receipt of said first identification code from said first portable security device; and
   a second portable security device associated with second user setting data stored in said programming device, said second portable security device operable to transmit a second identification code, wherein said transceiver is operable to establish priority between said first and second identification codes and initiate download of one of said first and second vehicle setting data based on said priority.

2. The system of claim 1 wherein said transceiver is adapted to establish priority based on proximity of said first and second portable security devices relative to a vehicle antenna.

3. The system of claim 1 wherein said transceiver is operable to transmit a polling signal to said first and second portable security devices.

4. The system of claim 3 wherein said first and second portable security devices are operable to respond to said polling signal with transmission of a respective identification code.

5. The system of claim 4 wherein said transceiver is operable to communicate a signal representing said vehicle data to a vehicle ECU, the ECU communicating one of said first and second vehicle setting data to a predetermined vehicle module upon receipt of a respective identification code.

6. The system of claim 1 wherein said first identification code is communicated from said first portable security device to said transceiver upon actuation of an input device on said first portable security device, wherein said transceiver is operable to determine if said first identification code corresponds to a predetermined identification code and receive said first vehicle setting data based on said first identification code corresponding to said predetermined identification code.

7. The system of claim 1 wherein said programming device is further defined as one of a cell phone, a personal digital assistant and a personal computer.

8. The system of claim 1 wherein said programming device is located remotely from the vehicle.

9. The system of claim 1 wherein one of said first and second vehicle setting data is downloaded from said programming device to said transceiver in the vehicle through an internet connection.

10. A system for communicating user identified preferences to a vehicle comprising:
    a programming device operable to receive input indicative of user defined vehicle settings;
    a first portable security device operable to receive said user defined vehicle settings and store said user defined vehicle settings as first vehicle setting data;
    a plurality of vehicle modules in the vehicle operable to receive said user defined vehicle settings;
    a transceiver residing in the vehicle and in data communication over a wireless communication link with said portable security device, said transceiver operable to initiate download of said first vehicle setting data directly from said programming device to the vehicle modules upon receipt of a first identification code from said first portable security device; and
    a second portable security device associated with a second user setting data stored in said programming device, said second portable security device operable to transmit a second identification code, wherein said transceiver is operable to establish priority between said first and second identification codes and initiate download of one of said first and second vehicle setting data based on said priority.

11. The system of claim 10, further comprising a data transfer medium for communicating said user defined vehicle settings from said programming device to said portable security device as one of said first and second vehicle setting data.

12. The system of claim 10 wherein said programming device communicates said user defined vehicle settings over a wireless communication link to said portable security device as one of said first and second vehicle setting data.

13. The system of claim 10 wherein said transceiver is operable to transmit a polling signal to one of said first and second portable security devices.

14. The system of claim 13 wherein one of said first and second portable security devices is operable to respond to said polling signal with a respective identification code.

15. The system of claim 14 wherein said transceiver is operable to determine if said first identification code corresponds to a predetermined identification code and receive said first vehicle setting data from said programming device based on said first identification code corresponding to said predetermined identification code.

16. The system of claim 15 wherein said programming device is operable to download said input as vehicle data based on said first portable security device attaining a predetermined proximity to said programming device.

17. A system for communicating user identified preferences to a vehicle comprising:
   a programming device adapted to directly receive user-input indicative of user-defined vehicle settings and operable to store said input as first vehicle setting data;
   a first portable security device operable to transmit a first identification code;
   a transceiver in data communication with said programming device over a wireless communication link and residing in the vehicle, said transceiver operable to initiate download of said first vehicle setting data directly from said programming device when said programming device attains an operational proximity to the vehicle, wherein said transceiver is operable to transmit a polling signal to said programming device and a second portable security device associated with second user setting data stored in said programming device, said second portable security device operable to transmit a second identification code, wherein said transceiver is operable to establish priority between said first and second identification codes and initiate download of one of said first and second vehicle setting data based on said priority.

18. The system of claim 17 wherein said programming device is operable to respond to said polling signal with a device identification code.

19. The system of claim 18 wherein said transceiver is operable to determine if said first identification code corresponds to a predetermined identification code and receive said first vehicle setting data based on said first identification code corresponding to said predetermined identification code.

* * * * *